United States Patent
Ogawa

(10) Patent No.: US 8,559,082 B2
(45) Date of Patent: Oct. 15, 2013

(54) IMAGE PROCESSING APPARATUS FOR GAMMA CONVERSION OF IMAGE DATA

(75) Inventor: Takeshi Ogawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1090 days.

(21) Appl. No.: 12/461,727

(22) Filed: Aug. 21, 2009

(65) Prior Publication Data

US 2010/0046017 A1   Feb. 25, 2010

(30) Foreign Application Priority Data

Aug. 22, 2008   (JP) .................................. 2008-214676

(51) Int. Cl.
*G03F 3/08*   (2006.01)

(52) U.S. Cl.
USPC ........ 358/519; 358/3.03; 358/3.13; 358/3.21; 382/237; 382/270

(58) Field of Classification Search
USPC ............. 358/3.03–3.06, 3.21–3.26, 519, 521, 358/534–536, 445, 465, 466; 382/251, 252, 382/270, 237
See application file for complete search history.

(56) References Cited

FOREIGN PATENT DOCUMENTS

| JP | 09-018723 | 1/1997 |
|----|-----------|--------|
| JP | 2004-072293 | 3/2004 |
| JP | 2007-124195 | 5/2007 |
| JP | 2007-215289 | 8/2007 |
| JP | 2009-49812 | 3/2009 |
| WO | WO 2008006131 A1 * | 1/2008 |

OTHER PUBLICATIONS

Japanese Office Action dated May 15, 2012.

* cited by examiner

*Primary Examiner* — Benny Q Tieu
*Assistant Examiner* — Michael Y Tzeng
(74) *Attorney, Agent, or Firm* — Harness, Dickey & Pierce, P.L.C.

(57) ABSTRACT

An image processing apparatus includes an integer-part converting unit configured to convert multi-level image data into integer image data by referring to a first conversion table, a threshold setting unit configured to generate matrix data for performing area coverage modulation by referring to the multi-level image data, a decimal-part converting unit configured to convert the multi-level image data into decimal image data by referring to a second conversion table, a level reducing unit configured to reduce levels of the decimal image data by using a threshold generated in the threshold setting unit, an adding unit configured to add the integer image data to the level-reduced decimal image data and outputting a result of addition as gamma conversion image data, and an image processing unit configured to perform image processing on the gamma conversion image data.

16 Claims, 6 Drawing Sheets

FIG.6

| INPUT VALUE | INTEGER VALUE |
|---|---|
| 1 | 0 |
| 2 | 1 |
| 3 | 2 |
| ⋮ | ⋮ |
| 254 | 232 |
| 255 | 255 |

FIG.7

| INPUT VALUE | DECIMAL VALUE |
|---|---|
| 1 | 133 |
| 2 | 87 |
| 3 | 12 |
| ⋮ | ⋮ |
| 254 | 225 |
| 255 | 0 |

FIG.8

| 0 | 128 | 32 | 160 | 8 | 136 | 40 | 168 | 2 | 130 | 34 | 162 | 10 | 138 | 42 | 170 |
|---|---|---|---|---|---|---|---|---|---|---|---|---|---|---|---|
| 192 | 64 | 224 | 96 | 200 | 72 | 232 | 104 | 194 | 66 | 226 | 98 | 202 | 74 | 234 | 106 |
| 48 | 176 | 16 | 144 | 56 | 184 | 24 | 152 | 50 | 178 | 18 | 146 | 58 | 186 | 26 | 154 |
| 240 | 112 | 208 | 80 | 248 | 120 | 216 | 88 | 242 | 114 | 210 | 82 | 250 | 122 | 218 | 90 |
| 12 | 140 | 44 | 172 | 4 | 132 | 36 | 164 | 14 | 142 | 46 | 174 | 6 | 134 | 38 | 166 |
| 204 | 76 | 236 | 108 | 196 | 68 | 228 | 100 | 206 | 78 | 238 | 110 | 198 | 70 | 230 | 102 |
| 60 | 188 | 28 | 156 | 52 | 180 | 20 | 148 | 62 | 190 | 30 | 158 | 54 | 182 | 22 | 150 |
| 252 | 124 | 220 | 92 | 244 | 116 | 212 | 84 | 254 | 126 | 222 | 94 | 246 | 118 | 214 | 86 |
| 3 | 131 | 35 | 163 | 11 | 139 | 43 | 171 | 1 | 129 | 33 | 161 | 9 | 137 | 41 | 169 |
| 195 | 67 | 227 | 99 | 203 | 75 | 235 | 107 | 193 | 65 | 225 | 97 | 201 | 73 | 233 | 105 |
| 51 | 179 | 19 | 147 | 59 | 187 | 27 | 155 | 49 | 177 | 17 | 145 | 57 | 185 | 25 | 153 |
| 243 | 115 | 211 | 83 | 251 | 123 | 219 | 91 | 241 | 113 | 209 | 81 | 249 | 121 | 217 | 89 |
| 15 | 143 | 47 | 157 | 7 | 135 | 39 | 167 | 13 | 141 | 45 | 173 | 5 | 133 | 37 | 165 |
| 207 | 79 | 239 | 111 | 199 | 71 | 231 | 103 | 205 | 77 | 237 | 109 | 197 | 69 | 229 | 101 |
| 63 | 191 | 31 | 159 | 55 | 183 | 23 | 151 | 61 | 189 | 29 | 157 | 53 | 181 | 21 | 149 |
| 254 | 127 | 223 | 95 | 247 | 119 | 215 | 87 | 253 | 125 | 221 | 93 | 245 | 117 | 213 | 85 |

| INPUT VALUE | DESIRED OUTPUT VALUE |
|---|---|
| 1 | 0.52 |
| 2 | 1.34 |
| 3 | 2.05 |
| ⋮ | ⋮ |
| 254 | 232.88 |
| 255 | 255 |

IMAGE PROCESSING APPARATUS FOR GAMMA CONVERSION OF IMAGE DATA

CROSS-REFERENCE TO RELATED APPLICATIONS

The present application claims priority to and incorporates by reference the entire contents of Japanese Patent Application No. 2008-214676 filed in Japan on Aug. 22, 2008.

BACKGROUND OF THE INVENTION

1. Field of the Invention

The present invention relates to for performing printing processing on multi-level image data in a high gradation manner with high precision.

2. Description of the Related Art

In an image input/output system, multi-level image data that is read by an input device, such as a scanner or a digital camera, is output to an output device, such as a printer or a display. The multi-level image data (for example, 256 levels for 8-bit precision) that is read by the input device is converted to image data with gray levels that can be output by the output device. The output data is represented as pseudo continuous tones using a process that is known as pseudo halftone processing.

In pseudo halftone processing, when the output device outputs only a binary image that is represented by dots that are either on or off, binarization processing is then performed. The binarization processing can be implemented with a dither method, an error diffusion method, and a minimum average error method. The dither method is faster. The error diffusion method and the minimum average error method produce good resolution and gradation.

The error diffusion method and the minimum average error method are theoretically very similar except that the timing of performing error diffusion is different between them. In addition to processing the binary image, the error diffusion processing includes multi-level error diffusion processing that is used for processing ternary or more gray levels. In a similar manner as in the binary error diffusion processing, the multi-level error diffusion processing can produce good resolution and gradation.

The output device outputs images with ternary or more gray levels using the various methods described below.

In inkjet printers, processes such as changing the diameter of dots, such as large, medium, and small dots, by controlling the amount of ink discharged from a print head, reproducing images with ternary or more gray levels by superimposing dots or using dark and light inks with different densities are undertaken. This makes it possible to produce images with ternary or more gray levels. A light ink obtained by diluting a dark ink in a range from ½ to ⅙ times the concentration of the dark ink typically used for this purpose.

In intaglio printing, such as gravure printing, an ink is applied to a printing plate in which depressions corresponding to matter to be printed are cut. In this case, the amount of ink should be transferred onto a sheet is controlled by changing the depth of those depressions. By controlling the amount of ink in this manner, it is possible to print images with ternary or more gray levels.

When printing is performed using printing presses, inkjet printers, and electrophotography, a dot gain phenomenon sometimes occurs. The dot gain phenomenon is a phenomenon in which dots become bigger than their desired size due to ink bleeding and/or ink spreading.

In error diffusion processing, errors that locally occur are diffused to neighboring pixels by performing a feedback control to maintain the density to a desired density. However, in high-density regions, dots become larger than their desired size due to dot gain phenomenon, whereby density saturation tends to occur in the high-density regions.

FIG. 9 is a graph that depicts the difference between input and output values. The dotted line indicates desired values with respect to an input value of 256 gray levels and the solid line indicates actual values. Even when brightness is required to be linearly output with 256 gray levels, as is indicated by the dotted line, it is clear from the graph that the result of the output value is actually like that indicated by the solid line due to dot gain. In other words, it is impossible to get the brightness that is the same as the desired brightness.

When performing error diffusion processing in typical printers, the processing is performed on an image that is subjected to gamma conversion in order to eliminate any effect caused by dot gain.

Even when errors are diffused, the effect of dot gain can be reduced by using real values obtained after the gamma conversion as shown in FIG. 10. Specifically, when a gray level of 1 is input to a printer, by performing error diffusion processing with a value of 0.52, it is possible to represent brightness or density corresponding to an input value of 1 that takes into consideration the effect of dot gain.

As shown in FIG. 10, values subjected to gamma conversion have decimal parts that are not integers. This requires a large memory capacity to save therein errors when computing values subjected to gamma conversion in the error-diffusion processing unit.

Accordingly, error diffusion processing is required in which both less memory space is used and the density saturation is reduced without deteriorating the gray levels of the original image.

An example of a known error diffusion technology that takes into consideration dot gain is disclosed in Japanese Patent Application Laid-open No. 2007-124195. In the technology disclosed in Japanese Patent Application Laid-open No. 2007-124195, when increasing the number of bits for each input value, an error-diffusion processing unit performs error diffusion by converting an input value of 8 bits into a value of 14 bits instead of simply multiplying the input value by 64, whereby the value is converted to a value that represents target brightness or density that takes into consideration dot gain. This makes it possible to obtain desirable gray levels.

In the technology disclosed in Japanese Patent Application Laid-open No. 2004-72293, the sum of coefficients to which diffuse errors are set is less than 1, whereby values of density are not stored by aiming at less density saturation in a high-density region.

In the dither method, because it is possible to design a system taking into consideration the effect of dot gain, there is no need to consider the above mentioned problems.

In the technology disclosed in Japanese Patent Application Laid-open No. 2007-124195, the memory capacity required for storing values that are obtained by performing error diffusion processing is larger than that when 8-bit values are input in error diffusion processing. This is so even though the required memory capacity is smaller than that when real numbers that are subjected to the gamma conversion in error diffusion processing are used as values to be saved.

In the technology disclosed in Japanese Patent Application Laid-open No. 2004-72293, density saturation rarely occurs in the high-density region; however, dot production is delayed in any highlighted region because errors are uniformly distributed with a value of less than 100%.

In the dither method, a rectangular super cell is generally used as a dither matrix. The super cell is formed such that a plurality of minimum unit cells used for dither processing is assembled. If the dither matrix with the super cell of size 32×32 is used, dot patterns of 1025 can be output. However, 1025 dot patterns are not required because a multi-level image, which is read using a commonly used input device, is formed of 8 bits (i.e., a value of 256).

The effect of dot gain can be reduced by selecting 256 dot patterns from among the gray levels that are capable of being output and that are obtained from the super cell of size 1025. The selection is done in such a manner that target brightness or density is obtained taking into consideration dot gain.

SUMMARY OF THE INVENTION

It is an object of the present invention to at least partially solve the problems in the conventional technology.

According to an aspect of the present invention, there is provided an image processing apparatus including a receiving unit configured to receive multi-level image data; an integer-part converting unit configured to receive the multi-level image data from the receiving unit and convert the multi-level image data into integer image data by referring to a first conversion table, the first conversion table containing data for converting the multi-level image data into the integer image data by discarding decimal parts of the multi-level image data subjected to gamma correction; a threshold setting unit configured to receive the multi-level image data from the receiving unit and generate matrix data for performing area coverage modulation by referring to the multi-level image data; a decimal-part converting unit configured to receive the multi-level image data from the receiving unit and convert the multi-level image data into decimal image data by referring to a second conversion table, the second conversion table containing data for converting the multi-level image data into the decimal image data by multiplying decimal parts of the multi-level image data subjected to gamma correction by the matrix data generated in the threshold setting unit; a level reducing unit configured to receive the decimal image data from the decimal-part converting unit and reduce levels of the decimal image data by using a threshold generated in the threshold setting unit; an adding unit configured to receive the integer image data from the integer converting unit and receive level-reduced decimal image data from the level reducing unit, add the integer image data to the level-reduced decimal image data, and output a result of addition as gamma conversion image data; and an image processing unit configured to receive the gamma conversion image data from the adding unit and perform image processing on the gamma conversion image data.

According to another aspect of the present invention, there is provided an image processing method including receiving multi-level image data; first converting including converting the multi-level image data into integer image data by referring to a first conversion table, the first conversion table containing data for converting the multi-level image data into the integer image data by discarding decimal parts of the multi-level image data subjected to gamma correction; generating matrix data for performing area coverage modulation by referring to the multi-level image data; second converting including converting the multi-level image data into decimal image data by referring to a second conversion table, the second conversion table containing data for converting the multi-level image data into the decimal image data by multiplying decimal parts of the multi-level image data subjected to gamma correction by the matrix data generated in the threshold setting unit; reducing levels of the decimal image data by using a threshold generated at the generating; adding the integer image data to the level-reduced decimal image data and outputting a result of addition as gamma conversion image data; and performing image processing on the gamma conversion image data.

According to still another aspect of the present invention, there is provided an image forming apparatus including the above image processing apparatus.

According to still another aspect of the present invention, there is provided a computer program product that includes a computer program stored on a computer-readable recording medium, the computer program when read and executed on a computer causes the computer to execute the above method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is an example of association of input values with output values of an integer part;

FIG. 7 is an example of association of input values with output value of a decimal part;

FIG. 8 depicts an example of a dither matrix;

DETAILED DESCRIPTION OF THE PREFERRED EMBODIMENTS

Exemplary embodiments of the present invention are described in detail below with reference to the accompanying drawings.

Figure 1:
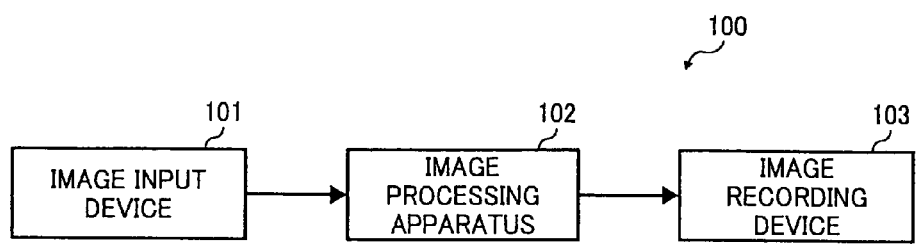
FIG. 1 is a block diagram of an image input/output system according to an embodiment of the present invention.

FIG. 1 is a block diagram of an image input/output system 100 that includes an image processing apparatus according to an embodiment of the present invention. Specifically, the image input/output system 100 includes an image input device 101, an image processing apparatus 102, and an image recording device 103.

The image input device 101 is, for example, a scanner or a digital camera. An original image is read (in case of a scanner) or acquired (in case of a digital camera) as image data with 256 levels for 8 bits, for instance. The image input device 101 inputs the multi-level image data into the image processing apparatus 102.

The image processing apparatus 102 converts the multi-level image data into data having the number of gray levels that can be output from the image recording device 103. The image processing apparatus 102 performs such a conversion by using a multi-level error diffusion method or a multi-level minimum average error method. The image data is quantized in the image processing apparatus 102 and sent to the image recording device 103. The image recording device 103 functions as an image forming apparatus or an image output device.

In the image input/output system 100, the image input device 101, the image processing apparatus 102, and the image recording device 103 are separate units; however, the configuration is not limited thereto. For example, the function of the image processing apparatus 102 can be included in the image input device 101 or the image recording device 103.

Figure 2:
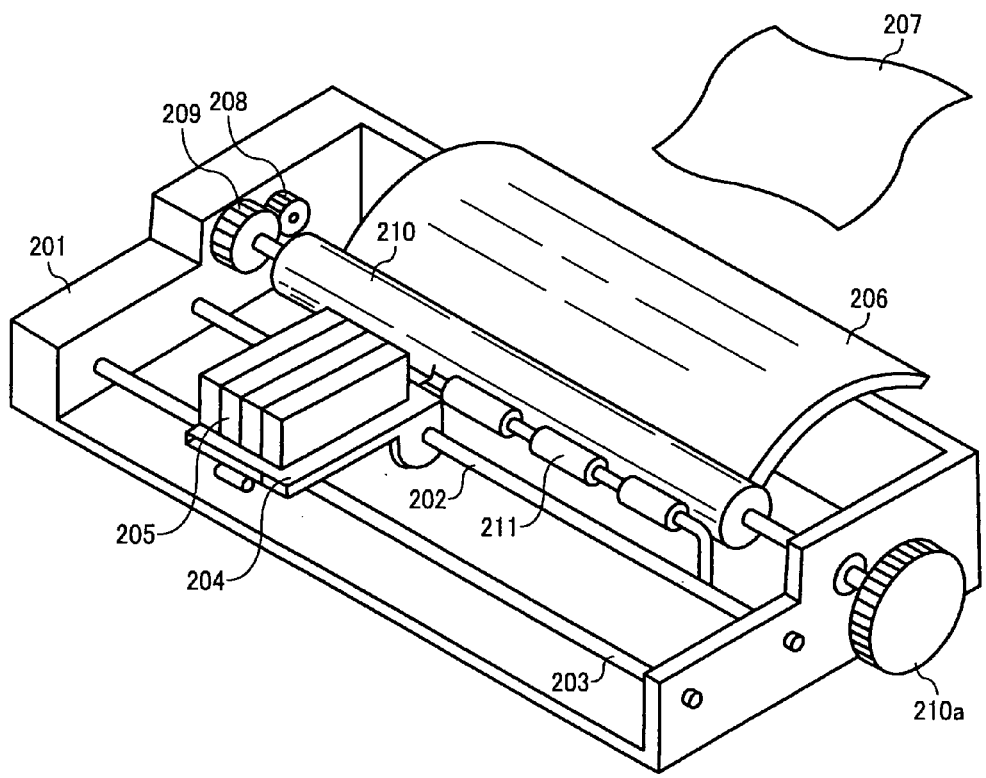
FIG. 2 is a perspective diagram of an image recording device shown in FIG. 1.

FIG. 2 is a perspective diagram of the image recording device 103. The image recording device 103 includes a frame 201, a pair of guide rails 202 and 203, a carriage 204, an ink-jet print head 205, a guide plate 206, a driving gear 208, a sprocket gear 209, a platen 210, and a plurality of pressure rollers 211.

The guide rails 202 and 203 are fit to lateral side walls of the frame 201. The carriage 204 includes the ink-jet print head 205 (hereinafter, "print head") and it is movably supported on and guided over the guide rails 202 and 203. The carriage 204 is driven on the guide rails 202 and 203 by a driving source such as a motor (not shown). By moving on the guide rails 202 and 203, the carriage 204 can scan a target surface in the direction parallel to the guide rails 202 and 203. The direction parallel to the guide rails 202 and 203 is called as a main scanning direction.

When a sheet 207 is placed on the guide plate 206, a driving source drives the driving gear 208. The sprocket gear 209 and the platen 210, which has a platen knob 210a, rotate along with the driving gear 208. The sheet 207 rotates along with the platen 210 and it is taken in. The sheet 207 is then conveyed into a nip between the platen 210 and the pressure rollers 211 that are in press contact with the platen 210. Printing is performed on a surface of the sheet 207 by the print head 205 that scans an image in the direction parallel to the guide rails 202 and 203.

Figure 3:
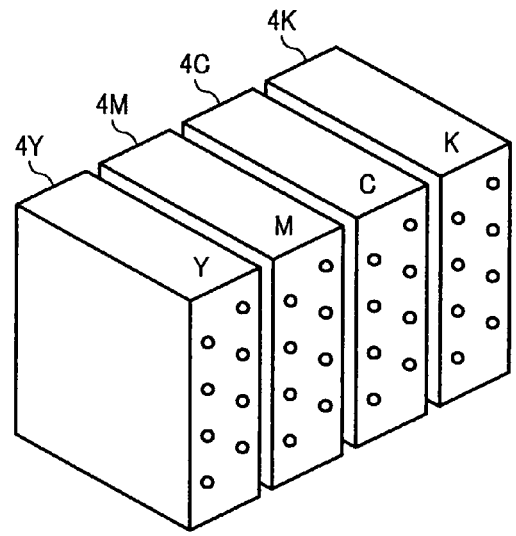
FIGS. 3 and 4 are perspective diagrams of print heads.
Figure 4:
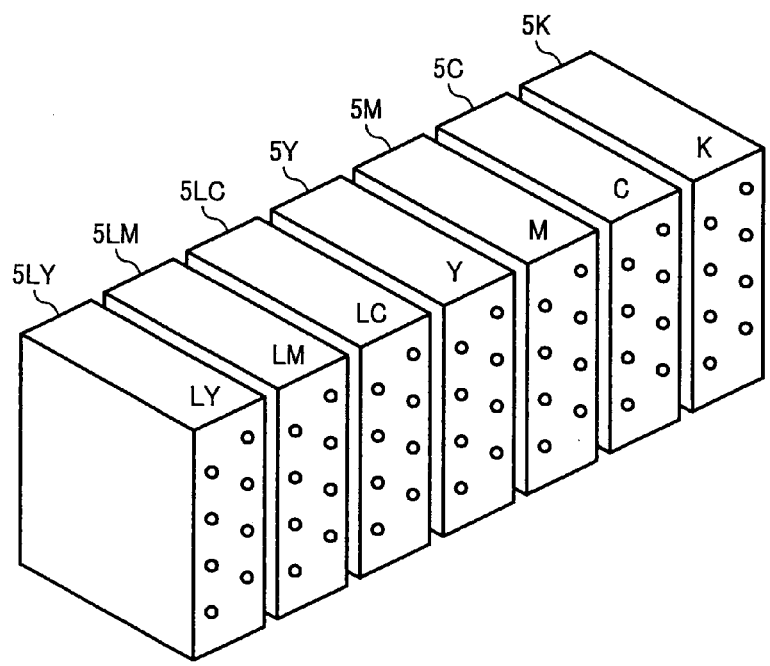

FIGS. 3 and 4 are perspective diagrams of typical print heads. The print head depicted in FIG. 3 includes four inkjet heads 4K, 4Y, 4M, and 4C. On the other hand, the print head depicted in FIG. 4 includes seven inkjet heads 5K, 5Y, 5M, 5C, 5LY, 5LM, and 5LM. The inkjet heads are arranged on the same line in the main-scanning direction. The print head depicted in FIG. 3 or the print head depicted in FIG. 4 can be employed as the print head 205.

In the print head depicted in FIG. 3, the inkjet head 4K discharges ink in black (K), the inkjet head 4Y discharges ink in yellow (Y), the inkjet head 4M discharges ink in magenta (M), and the inkjet head 4C discharges ink in cyan (C). The print head shown in FIG. 4 has three additional inkjet heads (i.e., 5LY, 5LM, and 5LC). That is, the print head shown in FIG. 4 is designed for seven colors. Precisely, the inkjet head 5LY discharges ink in light yellow (LY), the inkjet head 5LM discharges ink in light magenta (LM), and the inkjet head 5LC discharges ink in light cyan (LC).

The number of inkjet heads arranged is not limited to four or seven. For example, ink in light yellow can be omitted to reduce the costs because yellow dots are hard to be visually recognized in a highlighted region (low image density area). Alternatively, the print heads can be configured in such a manner that three or four density ranges are arranged to light black, or to cyan, magenta, yellow and black aiming at producing high quality images.

By selectively driving an actuator, such as a piezoelectric element and a bubble generating heater, serving as an energy generating unit, pressure is applied to the ink in the ink tank, and therefore, ink droplets are discharged from a nozzle communicating with the ink tank and adhered onto the sheet 207, thus forming an image on the sheet 207 using the inkjet heads.

The image processing according to the embodiment can be applied to a case in which the image recording device 103 forms images using, for example, electrophotography.

Figure 5:
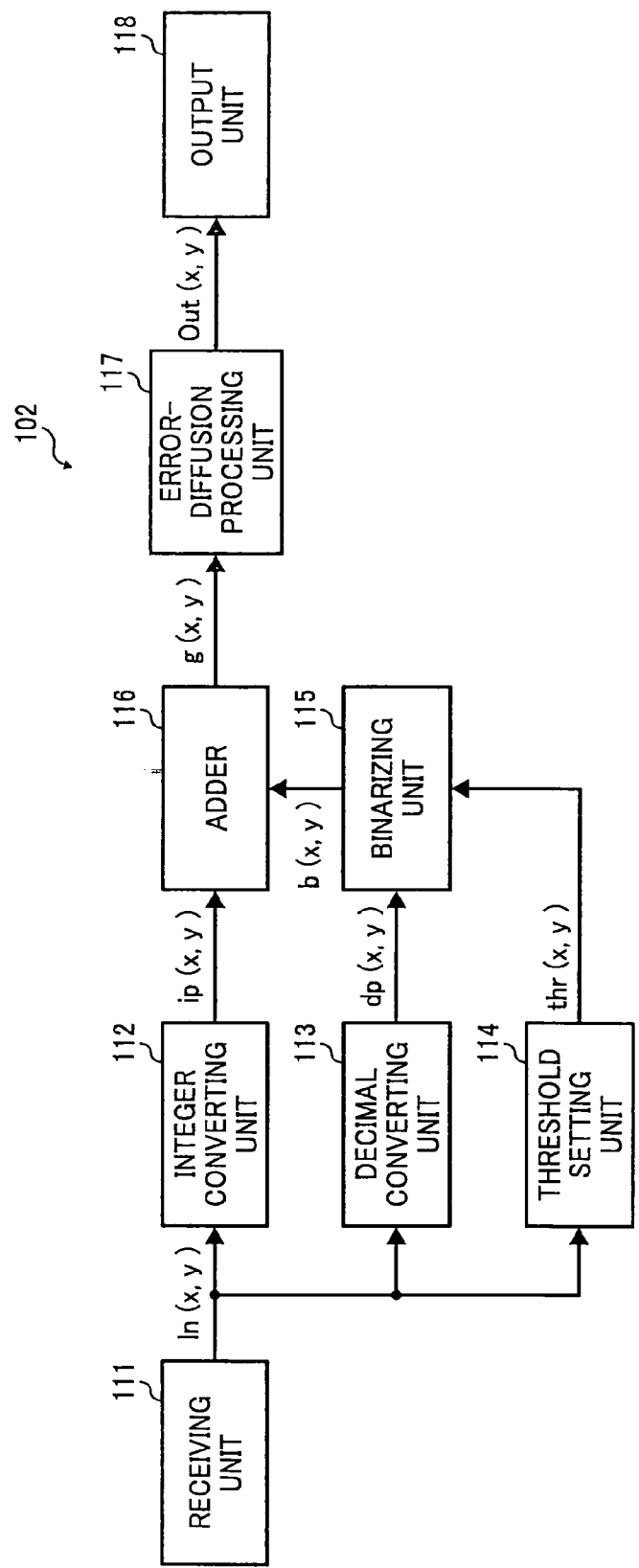
FIG. 5 is a functional block diagram of the configuration of an image processing apparatus shown in FIG. 1.

FIG. 5 is a block diagram of the configuration of the image processing apparatus 102. The image processing apparatus 102 includes a receiving unit 111, an integer converting unit 112, a decimal converting unit 113, a threshold setting unit 114, a binarizing unit 115, an adder 116, an error-diffusion processing unit 117, and an output unit 118.

The receiving unit 111 receives two-dimensional multi-level image data from the image input device 101. The two-dimensional image data is represented as In(x, y) (where x is an image address in the main-scanning direction, and y is an image address in the sub-scanning direction). The receiving unit 111 outputs the image data In(x, y) to each of the integer converting unit 112, the decimal converting unit 113, and the threshold setting unit 114.

The integer converting unit 112 holds a table shown in FIG. 6. Upon receiving the input data In(x, y) from the receiving unit 111, the integer converting unit 112 converts the input value to an integer value by subjecting the input value to gamma conversion and discarding decimals. The integer value will be represented as ip(x, y). The integer converting unit 112 outputs the integer value ip(x, y) to the adder 116.

The decimal converting unit 113 holds a table shown in FIG. 7. Upon receiving the input data In(x, y) from the receiving unit 111, the decimal converting unit 113 converts the input value to a decimal value based on a value of the decimal part obtained by subjecting the input value to gamma conversion. Specifically, a value of the decimal part obtained by subjecting the input value to the gamma conversion is multiplied by a dither matrix of size 256 (i.e., 16×16) that is stored in the threshold setting unit 114, and the multiplied value is converted to an integer by discarding decimals. The decimal value that is obtained by subjecting the decimal part to decimal-part conversion and corresponds to the input value In(x, y) is represented as dp(x, y). The decimal converting unit 113 outputs the decimal value dp(x, y) to the binarizing unit 115.

The threshold setting unit 114 holds a dither matrix shown in FIG. 8 and sets a threshold according to an address (x, y) corresponding to the input value In(x, y). The threshold corresponding to the input value of In(x, y) is represented as thr(x, y). The threshold setting unit 114 converts the threshold and outputs the threshold of thr(x, y) to the binarizing unit 115.

The binarizing unit 115 receives the decimal value dp(x, y) from the decimal converting unit 113 and receives the threshold of thr(x, y) from the threshold setting unit 114. The binarizing unit 115 binarizes (0 or 1) the decimal value and the threshold according to the following Expression by comparing the corresponding values:

If thr$(x, y) \leq$ dp$(x, y)$ g$(x, y)$=1 else g$(x, y)$=0

Specifically, when the decimal value dp(x, y) is larger than the threshold of thr(x, y), 1 is returned. When the decimal value dp(x, y) is smaller than the threshold thr(x, y), 0 is returned. The value that is binarized according to the decimal value dp(x, y) and the threshold of thr(x, y) is represented as b(x, y). The binarizing unit 115 outputs the binary decimal value b(x, y) to the adder 116.

The adder 116 adds the integer value ip(x, y) that is received from the integer converting unit 112 to the binary decimal value b(x, y) that is received from the binarizing unit 115 and creates a gamma conversion value represented as an integer. The gamma conversion value will be represented as g(x, y). After adding the integer value ip(x, y) to the binary decimal value b(x, y), the adder 116 outputs the gamma conversion value g(x, y) to the error-diffusion processing unit 117.

After receiving the gamma conversion value g(x, y) from the adder 116, the error-diffusion processing unit 117 subjects the gamma conversion value g(x, y) to simple binary error diffusion processing and binarizes the gamma conversion value g(x, y). The binarized value of the gamma conversion value g(x, y) will be represented as Out(x, y). The error-diffusion processing unit 117 outputs the binarized value Out(x, y) to the output unit 118.

The output unit 118 receives the binarized value Out(x, y) from the error-diffusion processing unit 117 and outputs it to the image recording device 103.

As described above, in the image processing apparatus 102, an integer is used for the gamma conversion value that is used for binary error diffusion processing, allowing the image processing apparatus to be configured in a memory-saving manner.

Binary error diffusion processing according to the embodiment of the present invention, which is effective in density saturation in a high density area, is described below.

Figures 9, 10:
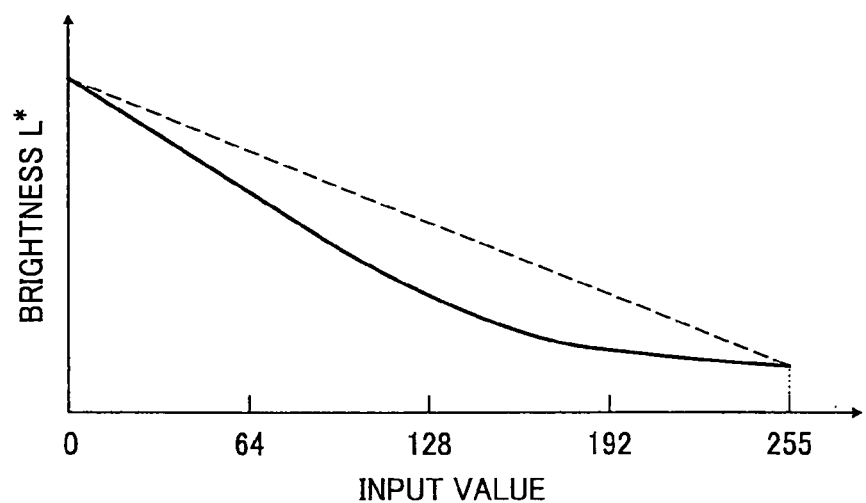
FIG. 9 is a graph of a difference between input values and output values.
FIG. 10 is an example of association of input values with values that are subjected to gamma conversions.

As shown in FIG. 10, in the conventional technology, desirable brightness or density that takes into consideration dot gain is obtained by performing the error diffusion processing after processing the gamma conversion by converting an input value to a real number to obtain an ideal output value that takes into consideration dot gain.

Huge memory capacity for saving errors is required when a real number that includes the decimal part is subjected to the error diffusion processing.

On the other hand, in the technology according to the embodiment of the present invention, a desirable output value taking into consideration dot gain with respect to the input value can be obtained by individually converting the integers and the decimals based on the conversion tables shown in FIGS. 6 and 7.

In the table shown in FIG. 10, a value of the decimal part obtained by the conventional gamma conversion processing is multiplied by 256 that corresponds to the dither matrix size shown in FIG. 8 and the decimal part of the obtained value are discarded. For example, in the conversion table depicted in FIG. 7, a conversion result with respect to the input value of 1 is 133. Specifically, among 256 pixels in the dither matrix, when a 133-th pixel is output as "1" and a 123-th pixel is output as "0", the average value of the binarization result for these 256 pixels is 0.52, which agrees with a result with respect to the input value of 1 obtained when conventional gamma conversion is processed.

Values are averaged in the error diffusion processing. A value of the decimal part is multiplied by the number of pixels to which area coverage modulation is subjected and the multiplied value is stored in a memory. A value that is binarized using the area coverage modulation is added to an integer part. This makes it possible to use the input value, which takes into consideration dot gain that is used for the error diffusion processing, represented as the integer that does not have the decimal part, whereby the real number including the decimal part need not be subjected to the gamma conversion. Accordingly, the error diffusion processing can be performed using the integer, thus reducing memory capacity required for the error diffusion processing.

As described above, according to the embodiment of the present invention, in grayscale conversion processing using the error diffusion processing, the decimal part is subjected to the area coverage modulation. This solves a problem of image deterioration caused by dot gain, and therefore, desirable image quality can be maintained.

In the above explanation, it has been mentioned that dither processing is used for subjecting the decimal part to the area coverage modulation; however, the configuration is not limited thereto. For example, the error diffusion processing can be used instead of dither processing because only the area coverage modulation needs to be performed. However, the dither processing is fast and therefore advantageous from the viewpoint of increasing the performance.

The dither pattern that is set in the threshold setting unit 114 is preferably a dispersed dither pattern rather than a convergence dither pattern to avoid moire due to interference with the error-diffusion processing unit 117. Bayer dither pattern is most preferable among the dispersed dither patterns because a smaller dither matrix can be employed, thus saving a memory space.

The larger the size of the dither matrix, the smaller the value that can be represented in the decimal part. However, if the size of the dither matrix is large, a large memory capacity is required for saving the values that are subjected to the dither processing in the threshold setting unit 114.

For example, when a 2×2 dither matrix is used for saving a memory capacity, a step of the decimal part capable of representing gradation is every 0.25 step. When printing is performed on standard paper using an inkjet printer, the difference in brightness between a white area and a dark area with high density of discharged ink is small, compared to a case where printing is performed on inkjet paper. When gradation is performed at a step of 0.25, it is difficult to convert to a value representing target brightness or density that takes into consideration dot gain. Accordingly, the size of the dither matrix is preferably 4×4, 2×8, 8×2, or more.

The output value of the decimal part in the conversion table shown in FIG. 7 is obtained by multiplying a value of the decimal part shown in FIG. 10, e.g., 0.52 with respect to an input value of 1, to which the conventional gamma conversion is subjected, by 256, which is the dither matrix size shown in FIG. 8, and discarding the decimal part of the multiplied value. However, the configuration is not limited thereto. For example, the values can be rounded off. By rounding off the values, it is possible to reduce a bad effect produced by a divisible error.

In the above explanation, it has been mentioned that the output values subjected to the area coverage modulation are 0 and 1 as the binary values; however, the configuration is not limited thereto. For example, the area coverage modulation can be performed by modifying the dither matrix using a ternary value or a quaternary value. However, when the ternary value or the quaternary value is used, unwanted texture could be output due to interference with the error diffusion processing performed by the error-diffusion processing unit 117. The decimal part subjected to the area coverage modulation preferably has a high-frequency property in a frequency space; therefore, the most desirable images are acquired when binary values of 0 and 1 are used in a real space.

In the above explanation, it has been mentioned that the binary error diffusion is performed; however, the configuration is not limited thereto. For example, ternary error diffusion can be performed using the light yellow (LY), the light magenta (LM), and light cyan (LC) ink shown in FIG. 4.

Moreover, the configuration is not limited to the error diffusion processing. For example, a minimum average error method can be used instead of the error diffusion processing.

In the above explanation, it has been mentioned that the inkjet printer is used; however, the configuration is not limited thereto. For example, a commonly used plotter, such as a plotter employing electrophotography scheme, offset printing press, and gravure printing press, can be used.

A system formed of a plurality of devices (for example, a host computer, an interface device, a reader, a printer) or a single device (for example, a copying machine, a facsimile) can be applied.

The above-described embodiment can be, of course, implemented by arranging a storage medium that stores therein program codes of software that implement the function mentioned in the above explanation in a system or an apparatus and reading the program codes stored in the storage medium by a computer, such as a central processing unit (CPU) or a microprocessor unit (MPU), arranged in the system or the apparatus. In such a case, the program codes themselves, which are read from the storage medium, implement the function mentioned in the above-described embodiment.

Examples of the storage medium for supplying the program codes include, for example, a flexible disk, a hard disk, an optical disc, a magneto-optic disk, a magnetic tape, a nonvolatile memory card, and a read-only memory (ROM).

By executing the program code that is read by the computer, it is possible to implement the function mentioned in the embodiment. Furthermore, an operating system (OS) running on the computer or the like performs the entire or a part of processing based on commands from the program code, thus, of course, implementing the function mentioned in the embodiment.

After the program code that is read from the storage medium is written in a feature expansion board installed in the computer or a memory included in a feature expansion unit connected to the computer, the feature expansion board or the CPU included in the feature expansion unit performs the entire or a part of processing based on the commands from the program code, thus, of course, implementing the function mentioned in the embodiment.

According to an aspect of the present invention, error diffusion processing is can be performed by using an input value of an integer that takes into consideration dot gain. This makes it possible to implement the error diffusion processing by suppressing density saturation in a memory-saving manner without degrading an original image tone.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
   a receiving unit configured to receive multi-level image data;
   an integer-part converting unit configured to receive the multi-level image data from the receiving unit and convert the multi-level image data into integer image data by referring to a first conversion table, the first conversion table containing data for converting the multi-level image data into the integer image data by discarding decimal parts of the multi-level image data subjected to gamma correction;
   a threshold setting unit configured to receive the multi-level image data from the receiving unit and generate matrix data for performing area coverage modulation by referring to the multi-level image data;
   a decimal-part converting unit configured to receive the multi-level image data from the receiving unit and convert the multi-level image data into decimal image data by referring to a second conversion table, the second conversion table containing data for converting the multi-level image data into the decimal image data by multiplying decimal parts of the multi-level image data subjected to gamma correction by the matrix data generated in the threshold setting unit;
   a level reducing unit configured to receive the decimal image data from the decimal-part converting unit and reduce levels of the decimal image data by using a threshold generated in the threshold setting unit;
   an adding unit configured to receive the integer image data from the integer converting unit and receive level-reduced decimal image data from the level reducing unit, add the integer image data to the level-reduced decimal image data, and output a result of addition as gamma conversion image data; and
   an image processing unit configured to receive the gamma conversion image data from the adding unit and perform image processing on the gamma conversion image data.

2. The image processing apparatus according to claim 1, wherein the threshold setting unit generates a dither matrix.

3. The image processing apparatus according to claim 1, wherein the second conversion table has data, for each gradation, obtained by multiplying by the matrix data that is generated in the threshold setting unit, and rounding off or discarding the decimal parts.

4. The image processing apparatus according to claim 1, wherein the threshold setting unit generates a dispersed dither.

5. The image processing apparatus according to claim 4, wherein the threshold setting unit generates a Bayer matrix.

6. The image processing apparatus according to claim 1, wherein the threshold setting unit generates the matrix data of any one of 4×4, 2×8, 8×2 size or larger.

7. The image processing apparatus according to claim 1, wherein the level reducing unit reduces levels by performing binarization.

8. An image forming apparatus comprising the image processing apparatus according to claim 1.

9. An image processing method comprising:
   receiving multi-level image data;
   first converting including converting the multi-level image data into integer image data by referring to a first conversion table, the first conversion table containing data for converting the multi-level image data into the integer image data by discarding decimal parts of the multi-level image data subjected to gamma correction;
   generating matrix data for performing area coverage modulation by referring to the multi-level image data;
   second converting including converting the multi-level image data into decimal image data by referring to a second conversion table, the second conversion table containing data for converting the multi-level image data into the decimal image data by multiplying decimal parts of the multi-level image data subjected to gamma correction by the matrix data generated in the threshold setting unit;

reducing levels of the decimal image data by using a threshold generated at the generating;

adding the integer image data to the level-reduced decimal image data and outputting a result of addition as gamma conversion image data; and performing image processing on the gamma conversion image data.

10. The image processing method according to claim 9, wherein the includes generating a dither matrix.

11. The image processing method according to claim 9, wherein the second conversion table has data, for each gradation, obtained by multiplying by the matrix data that is generated at the generating, and rounding off or discarding the decimal parts.

12. The image processing method according to claim 9, wherein the generating includes generating a dispersed dither.

13. The image processing method according to claim 12, wherein the generating includes generating a Bayer matrix.

14. The image processing method according to claim 9, wherein the generating includes generating the matrix data of any one of 4×4, 2×8, 8×2 size or larger.

15. The image processing method according to claim 9, wherein the reducing includes reducing levels by performing binarization.

16. A computer program product that includes a computer program stored on a non-transitory computer-readable recording medium, the computer program when read and executed on a computer causes the computer to execute:

receiving multi-level image data;

first converting including converting the multi-level image data into integer image data by referring to a first conversion table, the first conversion table containing data for converting the multi-level image data into the integer image data by discarding decimal parts of the multi-level image data subjected to gamma correction;

generating matrix data for performing area coverage modulation by referring to on the multi-level image data;

second converting including converting the multi-level image data into decimal image data by referring to a second conversion table, the second conversion table containing data for converting the multi-level image data into the decimal image data by multiplying decimal parts of the multi-level image data subjected to gamma correction by the matrix data generated in the threshold setting unit;

reducing levels of the decimal image data by using a threshold generated at the generating;

adding the integer image data to the level-reduced decimal image data and outputting a result of addition as gamma conversion image data; and performing image processing on the gamma conversion image data.

* * * * *